(12) United States Patent
Vollweiter

(10) Patent No.: US 7,370,738 B2
(45) Date of Patent: May 13, 2008

(54) ONE-PIECE FRICTION BODY WITH A SUPPORT AND A FRICTION PAD DISPOSED THEREON AND METHOD OF ITS MANUFACTURE

(75) Inventor: Heinrich Vollweiter, Vellberg (DE)

(73) Assignee: Rex Industrie-Produkte Grafe Von Rex GmbH, Vellberg (DE)

( * ) Notice: Subject to any disclaimer, the term of this patent is extended or adjusted under 35 U.S.C. 154(b) by 134 days.

(21) Appl. No.: 11/004,950

(22) Filed: Dec. 7, 2004

(65) Prior Publication Data

US 2005/0145454 A1 Jul. 7, 2005

(30) Foreign Application Priority Data

Dec. 12, 2003 (DE) ................................ 103 58 320

(51) Int. Cl.
*F16D 65/04* (2006.01)
(52) U.S. Cl. .............................. 188/250 B; 188/250 G; 188/251 R
(58) Field of Classification Search ............ 188/251 A, 188/250 G, 251 R, 250 B, 250 H; 192/107 M, 192/108
See application file for complete search history.

(56) References Cited

U.S. PATENT DOCUMENTS

| | | | | |
|---|---|---|---|---|
| 2,551,474 A | * | 5/1951 | Tilden | ...................... 188/251 A |
| 2,640,795 A | * | 6/1953 | Bertolet, Jr. | ............ 192/107 M |
| 2,784,105 A | * | 3/1957 | Stedman et al. | ............... 75/229 |
| 4,585,098 A | * | 4/1986 | Pike | ......................... 188/251 A |
| 5,585,166 A | * | 12/1996 | Kearsey | ....................... 428/212 |
| 6,723,208 B1 | * | 4/2004 | Hansen | ..................... 162/358.2 |
| 6,767,602 B1 | * | 7/2004 | Duval et al. | ................ 428/36.1 |
| 2002/0153213 A1 | * | 10/2002 | Gruber et al. | ......... 188/218 XL |

FOREIGN PATENT DOCUMENTS

WO WO-9814716 A1 * 4/1998

* cited by examiner

*Primary Examiner*—Melody M. Burch
(74) *Attorney, Agent, or Firm*—The Nath Law Group; Jerald L. Meyer; Matthew J. Moffa

(57) ABSTRACT

There is described a one-piece friction body having a support and at least one friction pad disposed thereon, based on friction materials containing reinforcing fibers, thermoset binders and customary additives, in which the at least one friction pad is joined to the support integrally and positive-locking by means of reinforcing fibers penetrating the boundary layer between the support and the friction pad. There is further described a method of manufacturing this friction body, comprising the steps of bonding together the friction materials containing reinforcing fibers, thermosetting binders and customary additives for the support and the at least one friction pad in the desired shape and arrangement, needling the reinforcing fibers contained in the friction materials of the composite in such manner that at least the reinforcing fibers of the friction material of the at least one friction pad penetrate at least in part the friction material of the support and of the other friction pad, respectively, and curing the needled intermediate under heat and pressure in a pressing mold corresponding to the friction body to be manufactured.

33 Claims, 1 Drawing Sheet

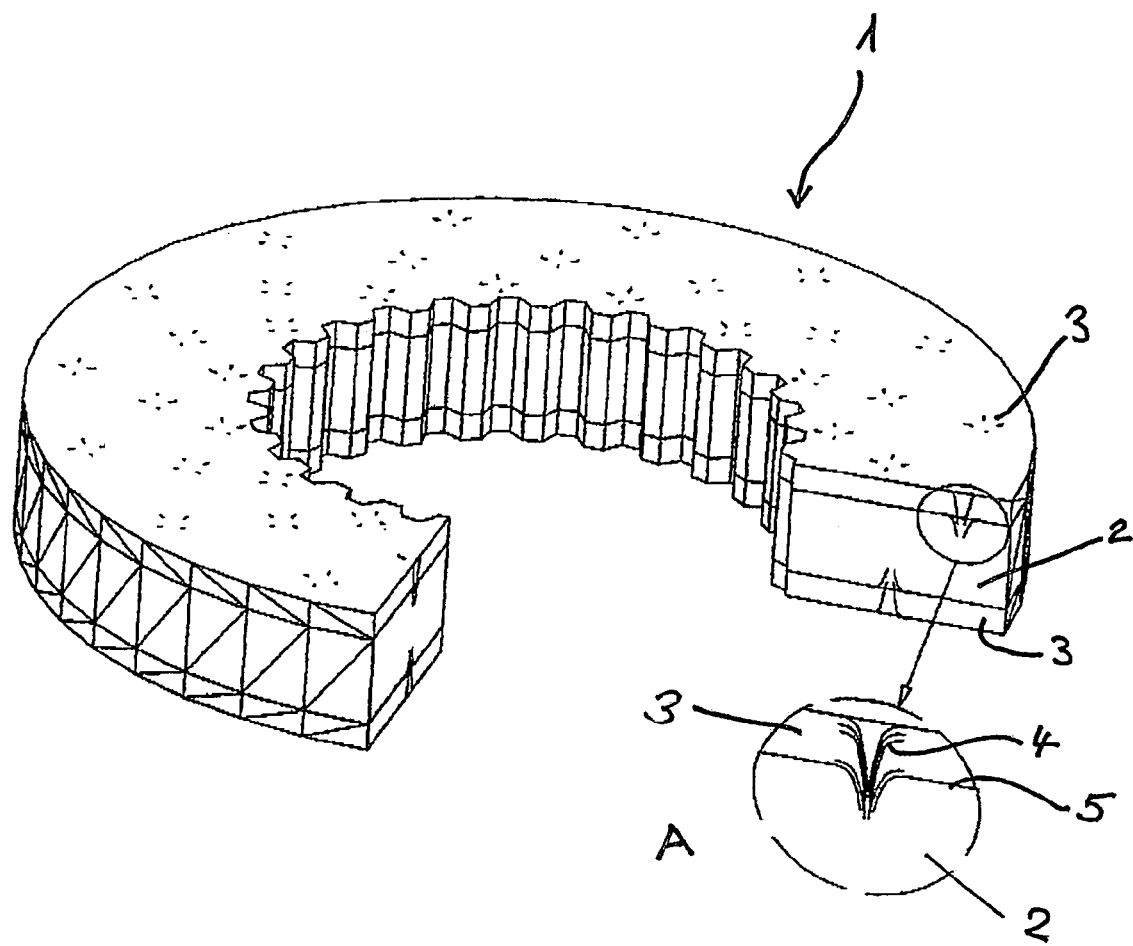

ONE-PIECE FRICTION BODY WITH A SUPPORT AND A FRICTION PAD DISPOSED THEREON AND METHOD OF ITS MANUFACTURE

FIELD OF THE INVENTION

The invention relates to a one-piece friction body with a support and at least one friction pad disposed thereon, based on friction materials containing reinforcing fibers, thermoset binders and customary additives, as well as a method of its manufacture.

BACKGROUND

Friction bodies which contain reinforcing fibers, lubricants, abrasives, inorganic materials and fillers in a binder matrix cured under the action of heat and pressure are widely used in various technical fields, in particular as brake pads, clutch pads, or friction pads. These friction bodies generally comprise a support, or a support plate, made of metal or synthetic material and at least one friction pad disposed thereon. The joining of the friction pad and the support is usually accomplished by riveting or bonding. The metallic support may be present in the form of a plate or hub with inner or outer teeth, or, however, also in the form of a brake block support.

The friction pad normally is produced by molding the corresponding friction materials under heat and stamping or cutting. The so produced friction pad is then bonded with the use of an adhesive, or riveted, onto the support which may consist of metal or an injection-molded synthetic material. The adhesives employed for this purpose contain solvents and are cured in the oven at elevated temperatures, thereby releasing solvents. The also employed two-component adhesives do not possess the heat resistance required in the use of the friction bodies.

Joining the friction pads to the support by riveting is laborious and expensive and only offers a pointwise fixing of the friction pad, so that the latter may bulge between the "rivets". Another large drawback lies in the high cost of manufacture of the metal supports, especially when these supports have inner or outer teeth which must have a very high fitting accuracy. Last, problems arise from the different thermal expansion of the metallic support and the friction pad due to distortion of the friction pads and their becoming detached from the support.

DE 21 09 907 A, for instance, discloses a pad for vehicle brakes, in particular a brake block consisting of a plurality of parts having different qualities, which parts are integrally joined, in particular by bonding with an adhesive. The joining of these individual parts to one another, and to the required support consisting, for example, of steel, not only is expensive due to providing this metallic support and the required adhesive but also cannot be satisfactory in view of the requisite joining of the parts of the friction body to one another and to the support.

From DE 39 05 627 C2 there is known a method of manufacturing a brake body for a disc brake comprising a flat back plate and as a friction pad a lining on the back plate, with at least two lining portions with different friction properties. The method resides in charging the granular material which corresponds to the different lining portions and which may contain different portions of polishing material depending on the respective lining portions into a molding frame comprising a partitioning unit separating the individual lining portions and at the same time forming all of the lining portions on the back plate by a pressing treatment and subjecting the lining portions on the back plate to a heating treatment under pressure.

EP 0 859 164 A1 discloses a friction element, in particular for an automobile brake or a friction clutch, wherein the friction element has a pad support and a friction pad mounted thereon, said friction pad having a variable friction value $\mu$ depending on the degree of wear so as to prevent in this manner the occurrence of undesired noises during operation.

The friction bodies known from this state of the art which comprise a support and at least one friction pad disposed thereon cannot be satisfactory in so far as the friction pad and the support are manufactured separately and in a manner involving high cost and must subsequently be joined, for example by bonding with an adhesive or by riveting, which methods of attachment often do not offer the strength that is required in practice, so that there may occur deformation, or possibly even detachment, of the friction pad disposed on the support.

SUMMARY OF THE INVENTION

It is now an object of the present invention to provide a one-piece friction body of the type as described above, in which the friction pad and the support are manufactured and joined to one another in a single operation, whereby it is easily possible to impart to the friction pad on the one hand and to the support on the other hand the properties required for the friction pad and the support, respectively, to fulfil their functions, and to nevertheless attain a homogeneous joint of these parts. It is another object to provide such a one-piece friction body which has at least two portions having different friction properties and/or mechanical properties and thus has, on one or both friction surfaces, portions having different friction properties. In this connection, it should be possible to also superpose the friction surfaces in the form of a plurality of layers having different layer thicknesses or, however, to design the friction surfaces in the form of segments or fields of any desired shape which are arranged side by side and have respectively different friction properties, so that one succeeds in adjusting the friction behavior exactly to the technical requirements for the intended use. In this connection, it must be ensured in all cases that the friction pad is joined to the support, or the friction pads are joined to one another and to the support, in such a way that there is a distinct increase in shear strength between the individual parts or layers, thus enhancing the strength properties of the friction body.

This object is accomplished in accordance with the invention in that the friction pad is joined to the support integrally and positive-locking by means of reinforcing fibers penetrating the boundary layer between the support and the friction pad.

The subject-matter of the invention therefore is the one-piece friction body according to claim 1. The subclaims relate to preferred embodiments of this subject-matter of the invention as well as to a method of manufacturing this one-piece friction body according to the invention.

Claim 1 therefore relates to a one-piece friction body with a support and at least one friction pad disposed thereon, based on friction materials containing reinforcing fibers, thermoset binders and customary additives, said friction body being characterized in that the at least one friction pad is joined to the support integrally and positive-locking by means of reinforcing fibers penetrating the boundary layer between the support and the friction pad.

Thus, in the case of the one-piece friction body according to the invention, both the support and the at least one friction pad disposed thereon consist of cured friction materials based on reinforcing fibers, thermosetting binders and customary fillers. In this connection, the components and the quantitative ratios of the friction materials for the support and for the at least one friction pad disposed thereon are so selected as to achieve the properties required for fulfilling the respective tasks, namely, on the one hand, the desired friction values of the friction pad, and on the other hand, the necessary strength values for the support which may have bores, teeth or other catch forms of any desired kind which can be formed in one operation in a pressing procedure using corresponding pressing molds at high pressing accuracy.

DESCRIPTION OF THE DRAWINGS

The drawing shows a partial section view of the one-piece friction body.

DETAILED DESCRIPTION

According to a preferred embodiment of this friction body, the friction materials of the at least one friction pad and the support are joined to one another integrally and positive-locking by needling of the reinforcing fibers contained in the respective friction materials, prior to curing of the friction materials under heat and pressure in a pressing mold corresponding to the friction body to be produced, from the outer surfaces of the friction body.

As shown in the drawing, the one-piece friction body (1) includes a support (2) and two friction pads (3) disposed thereon. As can be seen from enlarged part A of the drawing, the friction pad (3) is joined to the support (2) integrally and positive-locking by means of the reinforcing fibers (4) penetrating the boundary layer (5) between the support (2) and the friction pad (3).

As a result of the needling according to the invention of the friction materials for the support and the at least one friction pad disposed thereon, respectively, there is achieved an additional positive locking of the layers by a fiber composite, whereby it is possible to transmit higher shear forces as compared to the integral joint alone resulting from the curing of the friction materials containing the thermosetting binder.

In this connection, the needling according to the invention differs from the conventional needling technique which is applied, for instance, for the manufacturing of needled felts and resides in punching a pointed needle through the two layers to be bonded together by needling, and pulling the fiber from the lower layer upwardly to the upper layer with the aid of barbs disposed on the needle. According to the invention, due to the small length of the reinforcing fibers, the needling is performed in such a way that the reinforcing fiber is forced with the aid of a blunt needle from the first layer facing the needle into the layer located in the punching direction of the needle and containing, for example, the friction material for the support.

In this fashion the reinforcing fibers of the friction materials for the support and for the at least one friction pad disposed thereon, respectively, are forced from the outer surface through this friction material into the adjacent friction material for the support or another friction pad, in such manner that these reinforcing fibers penetrate the boundary layer between these friction materials and effect a positive locking of these friction materials. It is evident that the needling is performed prior to curing of the friction materials for the support and the at least one friction pad disposed thereon under heat and pressure in a pressing mold corresponding to the desired friction body.

As a result of the reinforcing fibers penetrating in this manner the boundary layer between the support and the friction pad, there is attained, after the curing of the friction materials, apart from the integral joint a positive locking by these reinforcing fibers, so that the properties of the friction body obtained in this manner are, from the point of view of application technology, distinctly superior to those of the conventional friction bodies in which a friction pad has been riveted onto a metallic support or bonded onto this support with the use of an adhesive. Furthermore, it is easily possible to specifically adapt the distinctly different property profile in the area of the support and of the friction pad, respectively, to the requirements for the intended use of the one-piece friction pad by adjusting the type and amounts of the components of the friction materials for the support and for the friction pad, or the friction pads, respectively.

According to another preferred embodiment of the invention, the friction body comprises at least two friction pads having different friction properties and/or mechanical properties, which friction pads are joined to the support and/or to one another integrally and positive-locking by means of reinforcing fibers penetrating the boundary layer between the support and the friction pad and/or between the friction pads.

According to another advantageous embodiment of the invention, the support and the friction pad, or the friction pads, are made of similar or different friction materials with correspondingly identical or different friction properties and/or mechanical properties.

In this connection, the similar or different friction materials of the friction pads and of the support are joined to one another and/or to the support integrally and positive-locking by needling of the reinforcing fibers contained in the different friction materials of these portions, prior to curing of the friction materials under heat and pressure in a pressing mold corresponding to the friction body to be manufactured, from the outer surfaces of the friction pads.

In accordance with another advantageous embodiment of the invention, the at least one friction pad is disposed on the support in the form of layers.

According to another preferred embodiment of the invention, the friction body comprises at least two portions with different friction properties which are superposed in the form of layers. According to another embodiment the at least two portions with different friction properties of the friction body according to the invention are arranged side by side in such a way that they form a common friction surface having different friction properties in the respective surface portions. This may preferably be accomplished in such manner that the one of the at least two portions having different friction properties surrounds the other portion to form a common friction surface with different friction properties in the respective surface portions.

Preferably, the one of the at least two portions having different friction properties is present in the form of one or a plurality of segments or fields of any desired shape, which are embedded in the friction material of the other portion to form a common friction surface with different friction properties in the respective segments or fields.

In accordance with a preferred embodiment of the invention, the support is provided in the form of a layer between two friction pads having identical or different friction properties and/or mechanical properties, whereby the support and the friction pads are joined integrally and positive-locking to the two friction pads by needling of the reinforcing fibers contained in the friction materials of the outer friction pads having identical or different friction properties, prior to curing the friction materials under heat and pressure in a pressing mold corresponding to the friction body to be manufactured.

The friction body according to the invention preferably contains 10 to 60% by weight, preferably 20 to 50% by weight of the reinforcing fibers, based on the weight of the friction body. The reinforcing fibers may be organic and/or inorganic fibers, for instance glass fibers, ceramic fibers, alumina fibers, carbon fibers, aramid fibers, steel fibers, or mixtures of these fibers.

The reinforcing fibers preferably have an average fiber length corresponding to at least half the thickness of the portions with different friction properties which are to be bonded together and of the support material layer, respectively, so as to ensure in this manner that, in the needling operation, the reinforcing fibers are forced in part to a sufficient extent into the support and into the other portion with different friction properties, respectively, so as to ensure in this way the positive locking essential for the invention. This is accomplished in that a sufficient number of reinforcing fibers extend from the one portion through the boundary layer into the other portion, thus effecting the positive locking of these portions as is essential for the invention. The reinforcing fibers preferably have an average fiber length of 3 to 15 mm, preferably of 5 to 10 mm.

It has been found that the joint according to the invention of the support and the friction pad, or the friction pads, and the portions with different friction properties, respectively, by means of the positive locking with the aid of the reinforcing fibers penetrating the boundary layer causes an about 30% increase in shear strength of the friction pads, which not only ensures a considerably higher stability of the friction body but also makes it possible to integrally form from the friction material the support plates which are required according to the state of the art and which must have bores and teeth or other catch forms, whereby the strength properties of the friction material in these portions can be specifically adapted to the forces occurring in these portions. Since in this case the material has, to a large extent, uniform thermal expansion properties, it is also possible to overcome the problems which arise when there are used other types of metallic support materials or synthetic support materials onto which the friction bodies must be fixed in the conventional manner by riveting or by bonding with the use of an adhesive.

Another subject-matter of the invention is a method of manufacturing the one-piece friction body according to the invention, which method is characterized in that the friction materials for the support and the at least one friction pad, which friction materials contain reinforcing fibers, thermosetting binders and conventional additives, are bonded together in the desired shape and arrangement, the reinforcing fibers contained in the friction materials of the resulting composite are subjected to needling in such a way that at least the reinforcing fibers of the friction material of the at least one friction pad penetrate at least in part the friction material of the support and/or the other friction pad and the needled intermediate is cured under heat and pressure in a pressing mold corresponding to the friction body to be manufactured.

According to the invention the claimed friction body is thus molded in one operation from the components of the friction materials which preferably do not contain any organic solvents, whereby it is possible to provide the friction body with a hub, teeth, or catch profiles of any other desired shape, in the hub or on the periphery. In this connection, the fitting accuracy of the molded pieces also within the teeth is, without an additional treatment, in the range of metal parts manufactured by cutting procedures, a circumstance that is made possible by homogeneous and weight-optimized friction materials which are preferably produced in a wet process without the addition of organic solvents. The holes resulting from the needling of the intermediate facilitate venting of the friction material in the pressing procedure, thereby surprisingly enhancing, in addition, the strength of the resultant friction body to a considerable extent.

The friction materials employed in the method according to the invention for the support and for the at least one friction pad contain, apart from the reinforcing fibers essential for the invention, a thermosetting binder, preferably a phenol resin, which may be optionally mixed with melamine resins, polyamides, epoxy resins, oils, cresol resins, and the like in amounts of 1 to 15% by weight. These friction materials further contain as customary additives lubricants such as graphite, molybdenum disulfide, barium sulfate, calcium carbonate or mixtures thereof in amounts of 10 to 25, preferably of 15 to 20% by weight, abrasives based on oxides, nitrides or carbides such as, for instance, $Al_2O_3$, $SiO_3$, $Cr_2O_3$, $Fe_2O_3$, $Fe_3O_4$, $ZrO_2$, MgO, CaO, SiC, PM, PC, $Si_3N_4$ and AlN and mixtures thereof in amounts of 0.5 to 10% by weight, preferably 1 to 5% by weight. The friction material may further contain fillers such as barium sulfate or calcium sulfate, vulcanized or unvulcanized natural rubber or synthetic rubber in amounts of 1 to 15% by weight, preferably 5 to 10% by weight. Depending on the type and amount of the applied conventional components, the properties of the friction materials for the different portions can be specifically adjusted to the desired final properties of the friction body according to the invention.

After the various friction materials for the support and for the at least one friction pad, respectively, have been produced, these friction materials are brought into the desired shape, for example the support is brought into the shape of a support layer and the friction pad into the shape of a friction pad layer which is disposed on this support material layer, by superposing on the support at least two friction pads in the form of layers or by arranging side by side on the support the at least two friction pads with different friction properties. Subsequently the material for forming a one-piece friction body is pressed together and subjected to needling in the fashion according to the invention in such manner that at least the reinforcing fibers of the one friction material penetrate, through the boundary layer, the other friction material, whereupon the needled intermediate is molded in the conventional manner under the action of heat and pressure and under curing of the thermosetting binder to form the one-piece friction body according to the invention. In this molding, the different portions of the friction body are joined due to the binders which are present in the different friction materials to form a homogeneous one-piece friction body, whereby the integral joint according to the invention is effected due to the preferably similar thermosetting binders employed for the two portions. Due to the fiber penetration on the boundary surfaces, the different portions are mechanically interlocked and thus the positive locking according to the invention is obtained.

In the procedure according to the invention, thus, the needling of the reinforcing fibers contained in the friction materials for the friction pad, or the friction pads, and the support material layer is performed in such a way that the reinforcing fibers of the friction pad layer, or the friction pad layers, penetrate in part at least the support material layer and that the reinforcing fibers of the support material layer penetrate at least in part the friction material layer of the at least one friction pad, respectively.

Needling is preferably performed by forcing the reinforcing fibers of the at least one friction pad at least in part into the support and/or the other friction pad. According to a preferred embodiment of the invention, needling is performed by partly forcing-in the reinforcing fibers with the aid of blunt needles. Preferably, needling is performed by partly forcing-in the reinforcing fibers from the outer surfaces of the composite with the aid of blunt needles. According to another embodiment, needling is performed by forcing-in the reinforcing fibers in part from the outer surfaces of the at least one friction pad and/or the support of the composite with the aid of blunt needles.

In all of these cases, the blunt needles are punched through the outer portions and through the support material layer, respectively, in such manner that the reinforcing fibers are forced at least in part into other portions behind there in the punching direction. In the case of the needling of a composite from the two outer surfaces, this is accomplished with the aid of staggered needles so that the needles punched in from the one side and from the other side, respectively, cannot hit each another and the strength of the homogeneous composite also does not deteriorate.

It is essential in the method according to the invention that needling is performed in such manner that the reinforcing fibers are passed at feast in part from the one portion into the adjacent portion with different friction properties and into the support material layer. In this connection, needling is performed preferably in such a way that the reinforcing fibers are passed at least as far as the center of the adjacent portion with different friction properties and/or of the support material layer.

According to a preferred embodiment, needling is performed by applying a needle density of 3 to 50 needles/cm$^2$, preferably 9 to 16 needles/cm$^2$, whereby this can be controlled by correspondingly adjusting the distance between the needles and the size of the staggering of the needles, resepctively, and by arranging the needles on a flat needle bed, respectively.

Needling is preferably performed with the use of cylindrical needles of any desired cross-section with a blunt front surface in vertical direction relative to the longitudinal axis. These needles are distinguished from those customarily applied for the needling of textile materials in that they do not have a pointed end at their front end relative to the working direction and also not a barb which is usually applied in needling to pull the fibers out from the one layer and into the other layer. In accordance with the invention, needling is performed by appying needles having a blunt front end, by forcing the reinforcing fibers from the portion facing the needle into the portion beneath it having different friction properties and into the support material layer present there, respectively. The cylindrical needles, which may have a circular, square, or polygonal cross-section, preferably have a diameter of 0.1 to 3 mm, preferably 0.5 to 1.5 mm.

Needling is suitably effected up to a needle penetration depth corresponding to half the length of the reinforcing fibers, so as to ensure in this manner that the reinforcing fibers are only in part forced out from the one portion and into the other portion, so as to ensure in this manner that the reinforcing fibers extend over the boundary layer between the two portions and that their ends are present in both the portions, thereby effecting the desired positive locking.

The friction body according to the invention and the method of its manufacture offer a number of advantages over the state of the art mentioned above, in that it is possible according to the invention to produce, in a simple manner and in one step, a fiber-reinforced one-piece compact pad which requires no metal support but into which the support is integrally molded, whereby optionally also portions with different friction properties are present due to the different friction materials employed, and thus a product is obtained which can exhibit different friction properties, strength values or absorbing properties on different surface portions. In this manner, one succeeds in exactly adjusting the desired friction values and attaining, even in the case of a small size, a high power transmission with an optimum absorption behavior.

Since the method according to the invention is performed without the use of solvents it is environmentally extremely beneficial, enables any desired combination of friction material and a bonding together of the materials without the use of an additional adhesive. According to the invention it is easily possible to produce the entire friction body from pre-fabricated individual raw pads of different formulations and to attain a fixed joint of the at least one friction pad to the support, and optionally of the portions having different friction properties, by needling the layers prior to molding under heat and pressure, and to achieve considerably higher shear forces without destroying the material.

The invention claimed is:

1. A one piece friction body having a support and at least one friction pad disposed thereon, based on friction materials containing reinforcing fibers, thermoset binders and customary additives,
    characterized in that the at least one friction pad is joined to the support integrally and positive-locking by means of reinforcing fibers penetrating the boundary layer between the support and the friction pad,
    further characterized in that the friction materials of the at least one friction pad and the support are joined integrally and positive-locking by needling of the reinforcing fibers contained in the friction materials from the outer surfaces of the friction body, wherein the reinforcing fibers contained in the friction materials are partly forced into the support with the aid of blunt needles, prior to curing of the friction materials under heat and pressure in a pressing mold corresponding to the friction body to be manufactured.

2. Friction body as claimed in claim 1, characterized in that it comprises at least two friction pads with different friction properties and/or mechanical properties which are joined to the support and/or to one another integrally and positive-locking by means of reinforcing fibers penetrating the boundary layer between the support and the friction pad and/or between the friction pads.

3. Friction body as claimed in claim 1, characterized in that the support and the friction pad, or the friction pads, consist of similar or different friction materials having correspondingly identical or different friction properties and/or mechanical properties.

4. Friction body as claimed in claim 1, characterized in that the similar or different friction materials of the friction pads and of the support are joined to one another and/or to the support integrally and positive-locking by needling of reinforcing fibers contained in the different friction materials of these portions, prior to curing of the friction materials under heat and pressure in a pressing mold corresponding to the friction body to be manufactured, from the outer surfaces of the friction pads.

5. Friction body as claimed in claim 1, characterized in that the at least one friction pad is arranged on the support in the form of a layer.

6. Friction body as claimed in claim 2, characterized in that the at least two friction pads with different friction properties are arranged on the support side by side and form a common friction surface with different friction properties and/or mechanical properties in the respective surface portions.

7. Friction body as claimed in claim 6, characterized in that the one of the at least two friction pads surrounds the other friction pad, or the other friction pads, to form a common friction surface with different friction properties and/or mechanical properties in the respective surface portions.

8. Friction body as claimed in claim 7, characterized in that the one of the at least two friction pads is present in the form of one or a plurality of segments or fields of any desired shape which are embedded in the friction material of the other friction pad to form a common friction surface with different friction properties and/or mechanical properties in the respective segments or fields.

9. Friction body as claimed in claim 1, characterized in that the friction body comprises at least two friction pads with different friction properties and/or mechanical properties, and that the support is provided in the shape of a layer between the two friction pads, the layer being joined to the two friction pads integrally and positive-locking by needling of the reinforcing fibers contained in the friction materials of the outer friction pads with identical or different friction properties, prior to curing of the friction materials under heat and pressure in a pressing mold corresponding to the friction body to be manufactured.

10. Friction body as claimed in claim 1, characterized by containing 10 to 60% by weight of reinforcing fibers, based on the total weight of the friction body.

11. Friction body as claimed in claim 1, characterized by containing organic and/or inorganic reinforcing fibers.

12. Friction body as claimed in claim 11, characterized by containing as reinforcing fibers glass fibers, ceramic fibers, alumina fibers, carbon fibers, aramid fibers, steel fibers, or a mixture of such fibers.

13. Friction body as claimed in claim 1, characterized in that the reinforcing fibers have an average fiber length corresponding to at least half the thickness of the at least one friction pad.

14. Friction body as claimed in claim 13, characterized in that the reinforcing fibers have an average fiber length of 3 to 15 mm.

15. Method of manufacturing the one-piece friction body as claimed in at claim 1, characterized in that the friction materials containing reinforcing fibers, thermosetting binders and customary additives for the support and the at least one friction pad are bonded together in the desired shape and arrangement, the reinforcing fibers contained in the friction materials of the composite are needled in such manner that at least the reinforcing fibers of the friction material of the at least one friction pad penetrate at least in part the friction material of the support and/or the friction material of the other friction pad, and the needled intermediate is cured under heat and pressure in a pressing mold corresponding to the friction body to be manufactured.

16. Method as claimed in claim 14, characterized in that the needling is performed by forcing the reinforcing fibers of the at least one friction pad at least in part into the support and/or the other friction pad.

17. Method as claimed in claim 16, characterized in that the needling is performed by partly forcing-in the reinforcing fibers with the aid of blunt needles.

18. Method as claimed in claim 17, characterized in that the needling is performed by partly forcing-in the reinforcing fibers from the outer surfaces of the composite with the aid of blunt needles.

19. Method as claimed in claim 14, characterized in that the needling is performed by partly forcing in the reinforcing fibers from the outer surfaces of the at least one friction pad and/or the support of the composite with the aid of blunt needles.

20. Method as claimed in claim 19, characterized in that the needling is performed from opposite outer surfaces of the composite with the use of staggered needles.

21. Method as claimed in claim 14, characterized in that the needling is performed in such a manner that the reinforcing fibers are passed into the adjacent friction pad and/or the support.

22. Method as claimed in claim 21, characterized in that the needling is performed in such manner that the reinforcing fibers are passed at least as far as the center of the adjacent friction pad and/or the support.

23. Method as claimed in claim 14, characterized in that the needling is performed by applying a needle density of 3 to 50 needles/cm$^2$.

24. Method as claimed in claim 14, characterized in that the needling is performed by applying cylindrical needles having a blunt front end in vertical direction relative to the longitudinal axis.

25. Method as claimed in claim 24, characterized in that the needling is performed by applying cylindrical needles having a diameter of 0.1 to 0.3 mm.

26. Method as claimed in claim 25, characterized in that the needling is performed by applying cylindrical needles having a circular, square or polygonal cross-section.

27. Method as claimed in claim 14, characterized in that the needling is performed up to a needle penetration depth corresponding to half the length of the reinforcing-fibers.

28. Method as claimed in claim 14, characterized in that the curing is performed under heat and pressure in a pressing mold corresponding to the final product.

29. Friction body as claimed in claim 1, characterized by containing 20 to 50% by weight of reinforcing fibers, based on the total weight of the friction body.

30. Friction body as claimed in claim 13, characterized in that the reinforcing fibers have an average fiber length of 5 to 10 mm.

31. Friction body as claimed in claim 1, characterized in that the friction materials are cured under heat and pressure in a pressing mold corresponding to the friction body to be manufactured.

32. Method as claimed in claim 14, characterized in that the needling is performed by applying a needle density of 9 to 16 needles/cm$^2$.

33. Method as claimed in claim 24, characterized in that the needling is performed by applying cylindrical needles having a diameter of 0.5 to 1.5 mm.

* * * * *